(12) United States Patent
Khoshnevis (10) Patent No.: US 7,495,654 B2
(45) Date of Patent: Feb. 24, 2009

(54) HAPTIC APPARATUS

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 611 days.

(21) Appl. No.: 11/143,696

(22) Filed: Jun. 2, 2005

(65) Prior Publication Data
US 2006/0047342 A1   Mar. 2, 2006

Related U.S. Application Data

(60) Provisional application No. 60/577,330, filed on Jun. 4, 2004.

(51) Int. Cl.
*G09G 5/00* (2006.01)
(52) U.S. Cl. .......................... 345/156; 414/5
(58) Field of Classification Search ............... 345/156; 414/5
See application file for complete search history.

(56) References Cited

U.S. PATENT DOCUMENTS

| | | | | |
|---|---|---|---|---|
| 5,354,162 A * | 10/1994 | Burdea et al. | ................ | 414/5 |
| 5,516,249 A * | 5/1996 | Brimhall | ................ | 414/5 |
| 5,583,478 A * | 12/1996 | Renzi | ................ | 340/407.1 |
| 6,059,506 A * | 5/2000 | Kramer | ................ | 414/5 |
| 6,408,289 B1 * | 6/2002 | Daum | ................ | 706/45 |
| 6,413,229 B1 * | 7/2002 | Kramer et al. | ................ | 600/595 |
| 6,497,672 B2 * | 12/2002 | Kramer | ................ | 600/595 |
| 6,686,911 B1 | 2/2004 | Levin et al. | | |
| 7,138,976 B1 * | 11/2006 | Bouzit et al. | ................ | 345/156 |
| 2001/0020937 A1 | 9/2001 | Rosenberg et al. | | |
| 2002/0113771 A1 | 8/2002 | Rosenberg et al. | | |
| 2002/0175901 A1 * | 11/2002 | Gettemy | ................ | 345/175 |
| 2003/0055410 A1 | 3/2003 | Evans et al. | | |

* cited by examiner

*Primary Examiner*—Alexander Eisen
*Assistant Examiner*—Christopher E Leiby
(74) *Attorney, Agent, or Firm*—McDermott Will & Emery LLP (57) ABSTRACT

A haptic apparatus may include a plate element positionable to extend over an anatomical segment of a user, and an elongate member coupled to the plate element and configured to be movably mounted onto the anatomical segment so as to remain substantially vertical and substantially perpendicular to the anatomical segment while the anatomical segment undergoes a motion. The haptic apparatus may further include a motion restrictor responsive to a control signal to impede the motion of the anatomical segment by generating an opposing force along the elongate member in a direction normal to the anatomical segment, thereby providing tactile feedback to the user.

19 Claims, 7 Drawing Sheets

HAPTIC APPARATUS

CROSS-REFERENCE TO RELATED APPLICATIONS

This application claims the benefit of priority under 35 U.S.C. § 119(e) from U.S. Provisional Application Ser. No. 60/577,330 entitled "OmniGrasp—A Full-Hand Cyber Grasp System" and filed on Jun. 4, 2004, by inventor Behrokh Khoshnevis. Provisional application Ser. No. 60/577,330 is incorporated herein by reference in its entirety.

STATEMENT REGARDING FEDERALLY SPONSORED RESEARCH

This work was funded in part by NSF Grant No. ERC-EEC-9529152. The government has certain rights in the invention.

BACKGROUND

There may be numerous applications for a force feedback interface in dexterous task simulations, in which it may be desirable to control forces on independent fingers. A number of haptic devices have been devised that attempt to create the feeling of grasping an object by fingers and hand.

Some haptic devices may be capable of providing force feedback to all five fingers. For example, an exoskeleton may be worn over a glove, which may provide measurement information about hand gestures, through several embedded sensors that register the motion at various joints. A host computer may recognize the position of the hand and fingers with respect to a virtual object being approached. The computer may perform collision detection, and send resulting forces to a force control unit that may have a servomotor for each finger. For each finger, a sheathed cable may connect the finger tip through cable guide bridges to a pulley mounted on a motor shaft. The motor rotation may be controlled by setting the effective cable length to be such that the finger is stopped when its virtual counterpart touches the virtual object.

These haptic devices may be quite costly, and may suffer from system complexity. Users of these haptic devices may be inconvenienced by the requirement of an additional sensor glove. The mechanical bandwidth of these devices may be quite low, resulting in an unrealistic feeling of grasp. Forces may be unrealistically exerted on the back of the fingers and hand as well, when a virtual object is held, due to cable guide bridges mounted on the back of fingers. Also, these haptic devices may provide force feedback on finger tips only, so that holding a ball may give the same feeling as holding a disk, for instance. This may limit their applicability.

SUMMARY

A haptic apparatus may include a plate element positionable to extend over an anatomical segment of a user, and an elongate member coupled to the plate element and configured to be movably mounted onto the anatomical segment so as to remain substantially vertical and substantially perpendicular to the anatomical segment while the anatomical segment undergoes a motion. The haptic apparatus may further include a motion restrictor responsive to a control signal to impede the motion of the anatomical segment by generating an opposing force along the elongate member in a direction normal to the anatomical segment, thereby providing tactile feedback to the user.

A haptic apparatus may include a plurality of assemblies. Each assembly may include an exoskeleton plate positionable so as to extend over an anatomical segment of a user, and an elongate member coupled to the exoskeleton plate and configured to be movably mounted onto the anatomical segment so as to remain substantially vertical and substantially perpendicular to the anatomical segment while the anatomical segment undergoes a motion. Each assembly may further include a motion restrictor responsive to a control signal to impede the motion of the anatomical segment by generating an opposing feedback force along the elongate member in a direction normal to the anatomical segment, thereby providing tactile feedback to the user.

A haptic apparatus may include an exoskeleton plate positionable so as to extend over an anatomical segment of a user, and an elongate member coupled to the exoskeleton plate and configured to be movably mounted onto the anatomical segment so as to remain substantially perpendicular to the anatomical segment while the anatomical segment undergoes a motion. The haptic apparatus may further include force feedback means responsive to a control signal for impeding the motion of the anatomical segment by generating an opposing feedback force along the elongate member in a direction normal to the anatomical segment, thereby providing tactile feedback to the user.

A method may include movably mounting an elongate member to an anatomical segment of a user so that the elongate member remains substantially vertical and perpendicular to the anatomical segment while the anatomical segment undergoes a motion. The method may further include sensing a change in the position of the anatomical segment with respect to a virtual object during the motion, and, upon detection of an imminent collision between the anatomical segment and the virtual object, impeding further motion of the anatomical segment by generating an opposing force along the elongate member in a direction normal to the anatomical segment, thereby providing tactile feedback to the user.

DETAILED DESCRIPTION

Haptic apparatuses are described that may implement full-hand haptic grasp systems. These systems may provide users with a realistic feeling of grasp, applicable to all finger segments (e.g. phalanges) as well as to the palm of the hand, as opposed to finger tips only.

Figure 1:
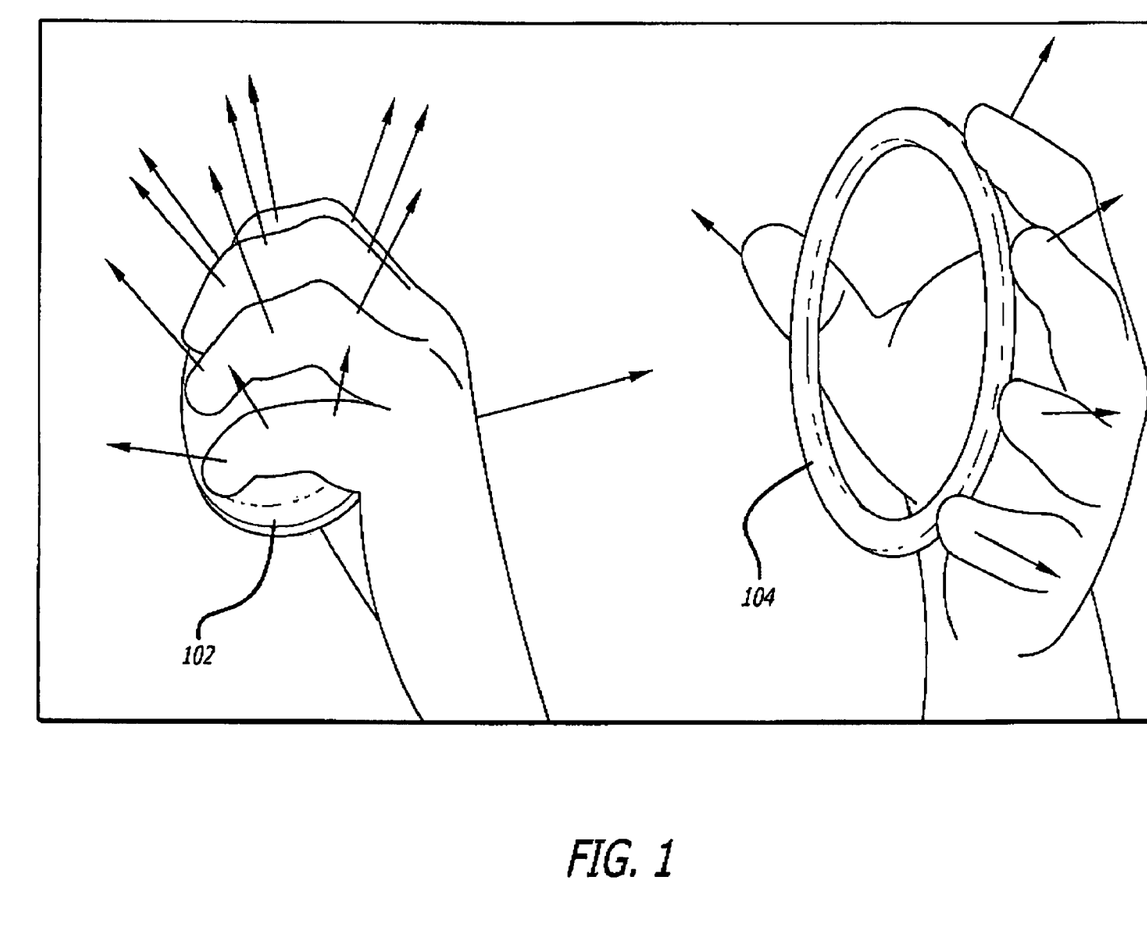
FIG. 1 schematically illustrates reaction forces that may be generated when objects are grasped by a user's hand and fingers.

FIG. 1 schematically illustrates resistive or opposing forces that may be generated when objects are grasped by a user's hand and fingers. As seen from FIG. 1, numerous segments under the hand and different finger segments may be involve when different objects, such as the illustrated spherical ball 102 and disk 104. As shown by the arrows in FIG. 1, the reaction forces exerted on the finger and hand segments are generally in a direction perpendicular to the contact point between the segments and the object.

Figure 2:
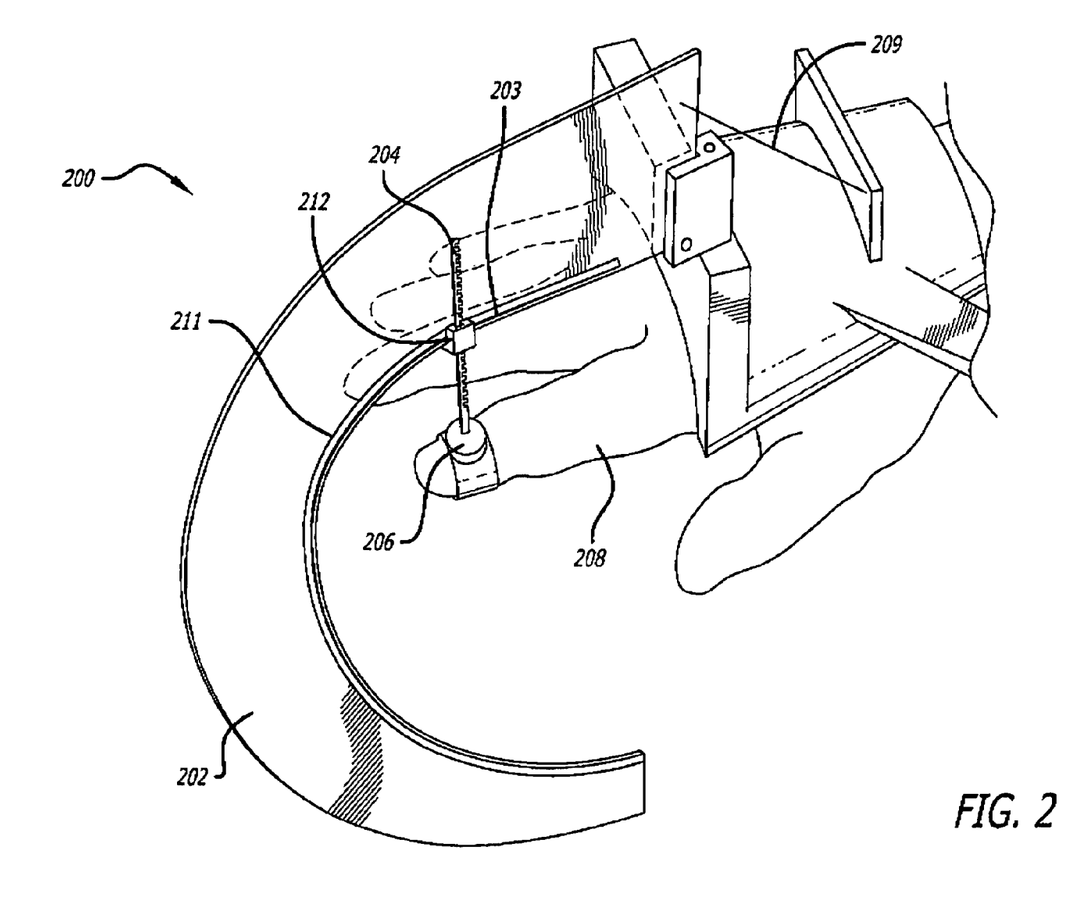
FIG. 2 illustrates a haptic apparatus including an exoskeleton plate and a toothed blade mounted on a single finger segment.

FIG. 2 illustrates a haptic apparatus 200 mounted on a single finger segment of a user. In overview, the haptic apparatus 200 includes a plate element 202; an elongate member 204 coupled to the plate element 202; and a motion restrictor 206. The plate element 202 may be positioned to extend above the finger 208 of the user. The plate element 202 may be an exoskeleton plate (henceforth referred to as "ExoPlate"). The elongate member 204 can be rotatably (or otherwise movably) mounted onto the finger segment in a way that it always stays substantially vertical and substantially perpendicular to the finger segment, as the finger segment moves.

The motion restrictor 206 may be configured to impede further motion of finger segment, for example in response to a control signal from a controller (not shown) that detects one or more collisions between a virtual object and a virtual counterpart of the finger segment. The motion restrictor 206 may impede the motion of the finger segment by generating an opposing feedback force along the vertical member 204 in a direction normal to the finger segment, thereby providing tactile feedback to the user.

In the illustrated embodiment, the elongate member may be a straight toothed blade 204 which can be rotated on demand by 90 degrees. The apparatus 200 may accomplish feedback force generation by activating rotation of the blade 204. Such a rotation engages the teeth of the blade 204 in the protruded edge 203 of the ExoPlate 202, which extends above a finger. The ExoPlate 202 may be made of a solid and light thin sheet of strong material such as carbon composite, or preferably a transparent material such as polycarbonate. Use of transparent material eases the wearing of the device as the ExoPlate 202 would not obstruct the view of the fingers not directly in the line of sight.

In this embodiment, the motion restrictor may be a rotation actuator 206 which is strapped over the finger segment. The lower end of the toothed blade 204 may be attached to the rotation actuator 206. When the blade 204 becomes engaged in the protruded lower edge 203 of the ExoPlate 202, it may stop the motion of the associated finger segment along the length of the blade 204. The opposing force generated by such rotation and engagement may be a bidirectional force, i.e. may include both an upward component and a downward component along the blade 204.

The blade rotation may be activated by transmission of a control signal from the controller. The controller may sense the motion of the finger segment, and monitor the relative position of a virtual counterpart of the finger segment with respect to a virtual object. The controller may generate the control signal once the virtual object collides with the associated virtual finger segment. Alternatively, one or more position sensors (not shown) may detect the position and motion of the finger segment, and transmit information relating to the detected position and motion to the controller, which may generate the control signal when it detects a collision between the virtual counterpart of the finger segment and the virtual object.

The resulting rotation of the blade 204 may be immediate, and may be accomplished by various actuation components such a rotary solenoid or a small electric motor. The electric motor at 90 degree end of range points may run into mechanical stops and stalls, and a return may be made possible by a spiral spring or reverse current.

In the embodiment illustrated in FIG. 2, the actuation of rotation and force feedback generation is shown for one finger segment only, and as being applied to the finger tip. The apparatus 200 does not exert any fictitious pressure on the back of the finger.

Each ExoPlate 202 may pivot sideways, following the sideway motion of the associated finger. Such sideways pivoting may be accomplished by attachment of simple small solid sheets (not shown) to the base of the ExoPlates 202. The small sheet elements may extend on each side of the finger, and may transfer the sideway motion of the finger to the ExoPlate 202.

Each ExoPlate 202 may also optionally pivot toward the palm of the hand. This motion may be restricted by a servo motor (not shown), either remotely or by locally pulling and releasing a restraining cable 209. This optional pivoting action can be used to provide a proportional force feedback for grasping elastic objects such as a sponge ball.

To keep the blade in close vicinity of the protruded edge of the ExoPlate 202, a slider block 212 may be used. The slider block 212 may move along the edge of the ExoPlate 202 while always engaged in a groove 211 on the plate 202, the groove 211 serving as a guideway. The side surfaces on the opening on the slider block 212 through which the blade 204 traverses may be rounded. This may allow the blade 204 to move freely, without getting its teeth stuck in sharp edge on the block 212.

While the haptic apparatus 200 is described as being mounted on a finger segment, in principle it may be mounted on any other anatomical segment of the user.

A configuration in which each blade assembly may be independently used for each finger segment may allow for control of every finger segment without mechanical complication. In cable based designs, on the other hand, control of more than one finger segment may not be possible because of the dependencies of motion of each finger segment, and the resulting mechanical intractability.

Figure 3A:
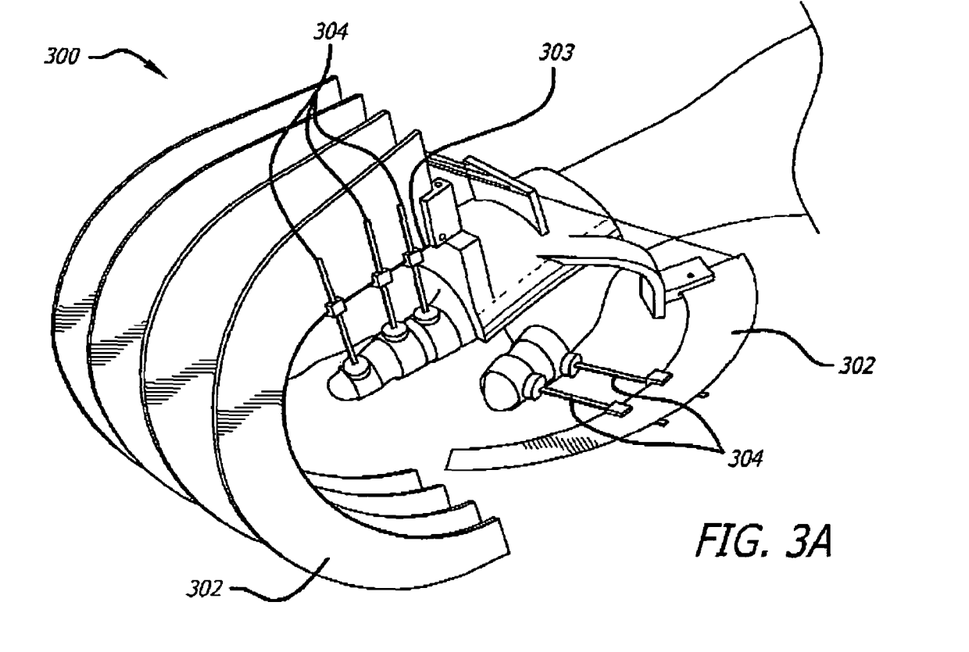
FIGS. 3A and 3B illustrate a haptic apparatus in which a plurality of assemblies are mounted on a corresponding plurality of fingers.
Figure 3B:
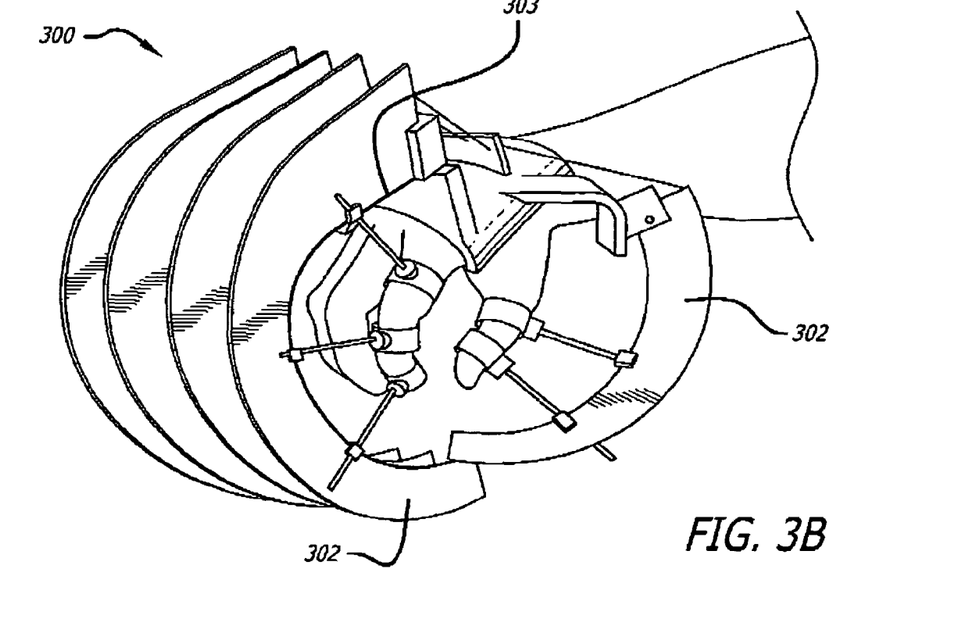

FIGS. 3A and 3B illustrate a haptic apparatus 300 in which a plurality of blade-ExoPlate assemblies are mounted on a corresponding plurality of fingers. Each blade 304 in the apparatus 300 may always be substantially perpendicular to its associated finger segment, and hence when it becomes engaged to an edge 303 of an ExoPlate 302, it may apply a force which is in the direction of the normal to the finger segment.

Figure 4A:
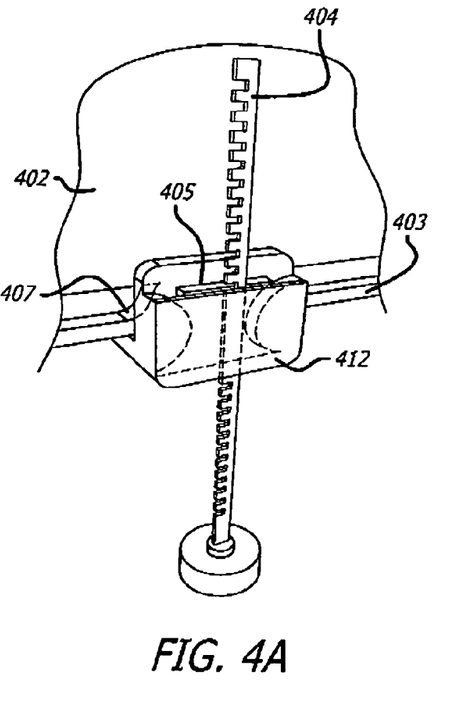
FIGS. 4A, 4B, and 4C illustrate different ways in which a toothed blade may become engaged onto an edge of the exoskeleton plate.
Figure 4B:
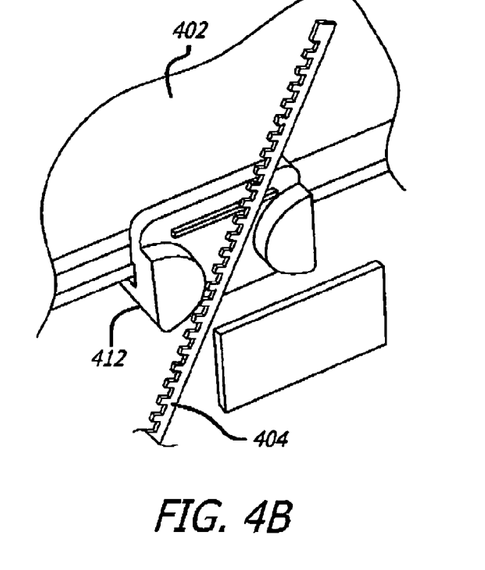
Figure 4C:
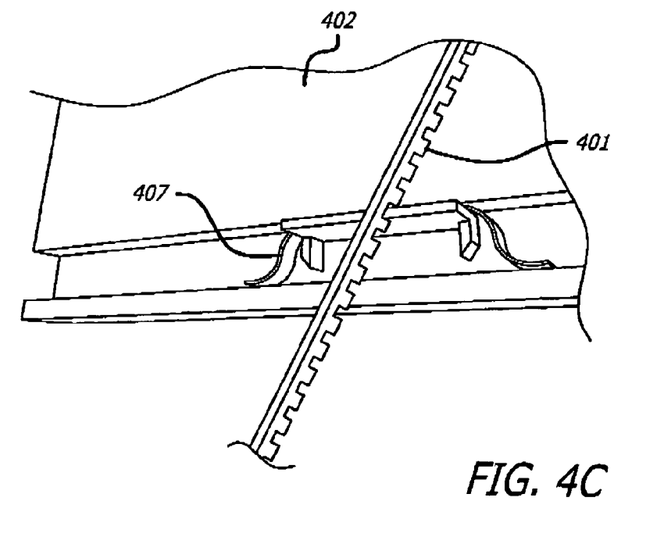

FIGS. 4A, 4B, and 4C illustrate different ways in which a toothed blade 404 may become engaged onto an edge 403 of the exoskeleton plate 402. If the ExoPlate is made of wearable materials such as plastics (e.g., polycarbonate), it may not be desirable to engage the blade teeth with the ExoPlate, as the plate edge may be damages and wear out over time. In the embodiment illustrated in FIG. 4A, the blade teeth may become engaged in a small hard metal edge 405 installed in the slider block 412.

In the embodiments illustrated in FIGS. 4B and 4C, the blade 404 may not, in certain positions, be perpendicular to the inner edge of the ExoPlate 402. In these cases, even though the blade 404 may get locked to the slider block 412 upon rotation, it may unwontedly pull and slip the slider block 412 along its guide. This slippage may be undesirable, because it may not allow the locking of the finger segment at the desired position. To remedy this situation, a metallic piece with two sharp edges may be used which upon pull-down by the blade 404 may touch the inner surface of the ExoPlate guide groove, acting as a break mechanism. To keep these sharp edges away during free slide an elastic spring component (indicated with reference numerals 407 in FIGS. 4A and 4C) may be used.

The toothed blade 404 may be also rotated remotely by means of a sheathed cable which may be pulled at a remote location by a linear solenoid. The finger end of the cable may in turn rotate a pulley around which the cable core is wound. A spring may return the pulley upon solenoid release.

Figure 5A:
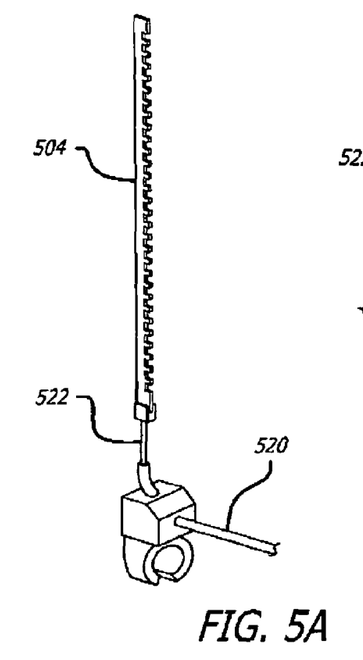
FIGS. 5A, 5B, and 5C illustrate embodiments in which a sheathed cable with a shaped memory wire core may be used to rotate the toothed blade.
Figure 5B:
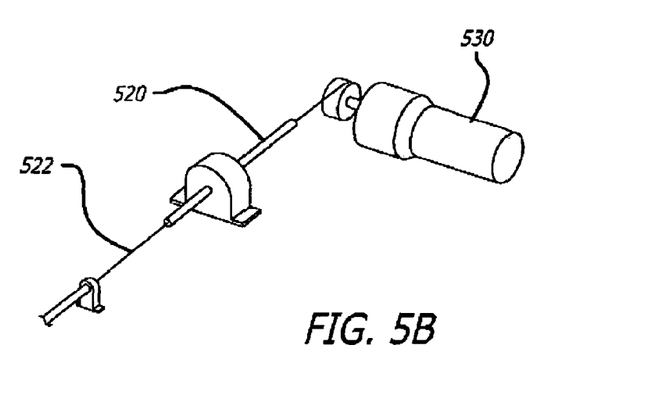
Figure 5C:
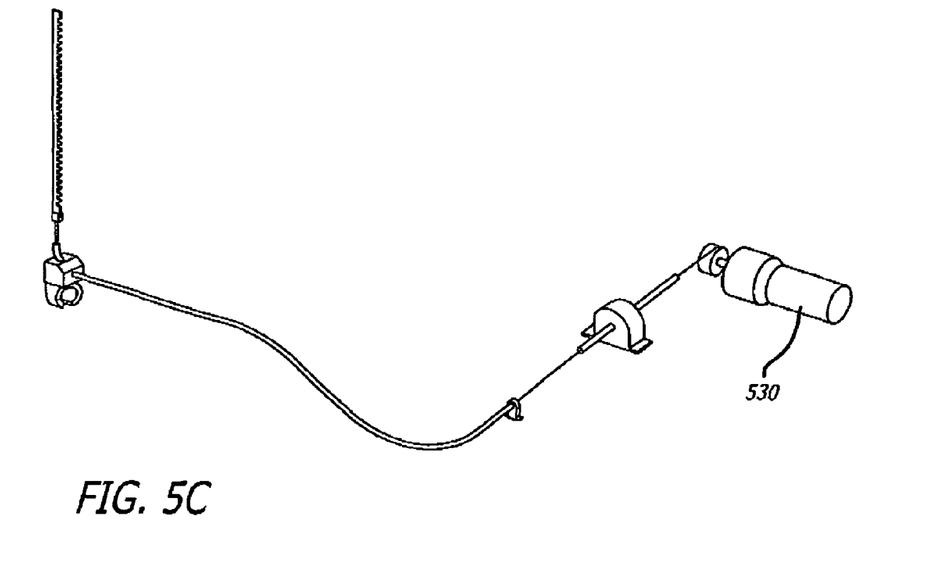

Alternatively, a sheathed cable with a Shaped Memory Wire (henceforth referred to as "SMW") core may be used, as shown in FIGS. 5A, 5B, and 5C. In these embodiments, a sheathed cable 520 with a shaped memory wire core 522 are used to rotate the toothed blade 504. The wire end may be attached to the base of the toothed blade.

An SMW may have many properties. One property may be that an SMW may return to a given length after it is heated, usually through passage of an electric current. Another property may be that an SMW typically does not easily buckle or bend, and when one end of a SMW is rotated, the torsion may be transferred along the length of the wire, even if the wire has many twists and turns.

The latter property of SMWs may be useful in the embodiments illustrated in FIGS. 5A, 5B, and 5C. In these embodiments the SMW wire 522 may be bent by passage through the angle tube at the finger side, and as it emerges it may stay straight and hence perpendicular to the associated finger segment. Also, the SMW wire 522 may be rotated remotely by a rotary solenoid, and the rotation action may be transferred to the finger side. When attached to the toothed blade, the wire rotation may in turn rotate the blade. Mechanical stops may be used at the finger side and a rotation of more than 90 degrees may be applied to compensate for possible wire torsions.

A servo motor 530 may be attached to each wire end to provide "independent" proportional force feed back to each segment of the finger. The wire may be wound around the servo motor pulley which provides it with reciprocal movement, while the rotary solenoid may apply rotation by means of a rod with a square cross section. A realistic feeling of grasp of objects made of several materials with various elasticity property (e.g., a screw driver with a soft rubber handle coating) may be made possible, in this configuration.

Figure 6:
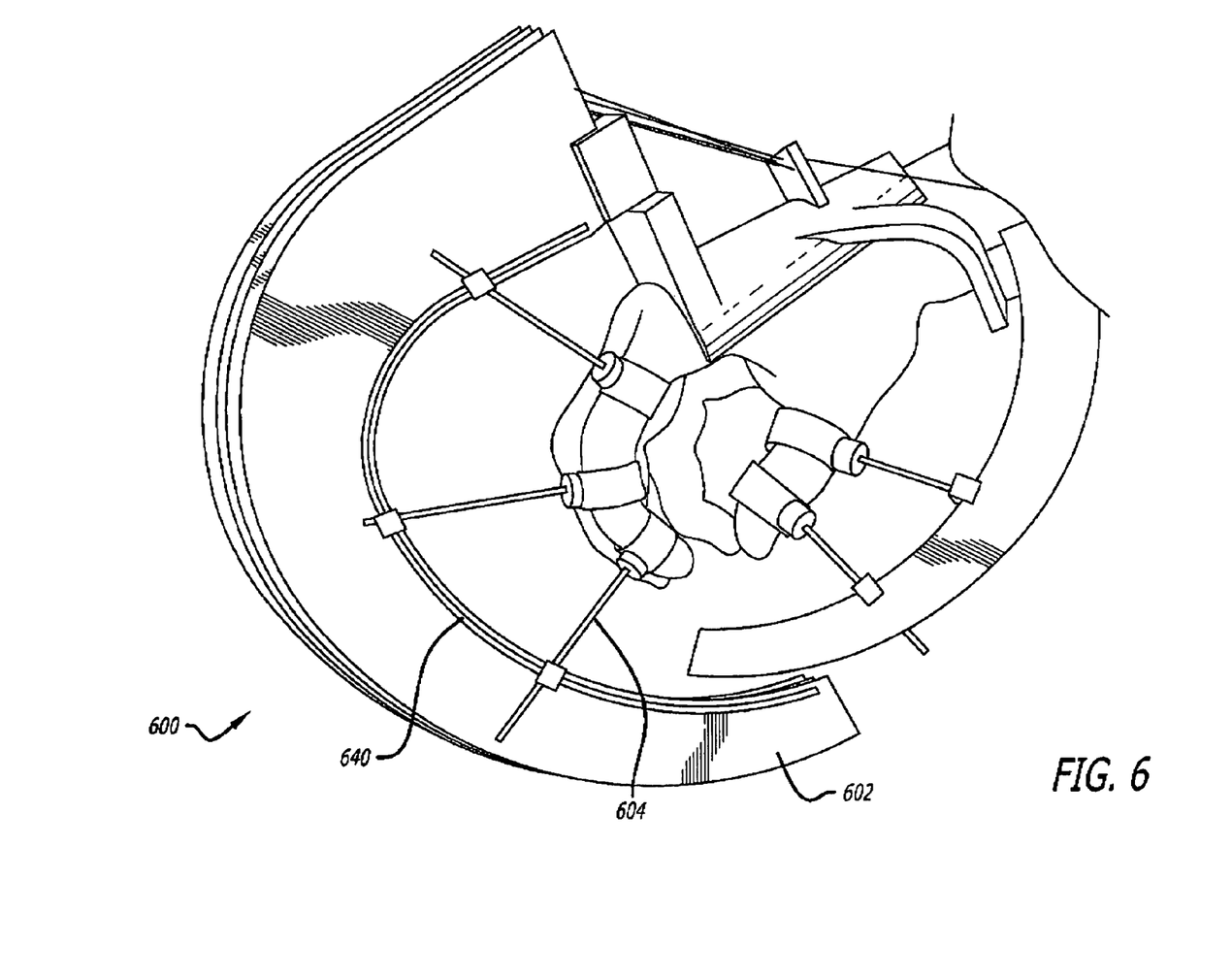
FIG. 6 illustrates an embodiment of a haptic apparatus that can provide tactile feedback without using a position sensing glove.

The haptic apparatus described above may or may not be used with a position sensing glove. FIG. 6 illustrates an embodiment of a haptic apparatus 600 that can provide tactile feedback without using a position sensing glove. The glove may be avoided if a strip of material 640 with electrical resistance is placed along the edge of the ExoPlate 602 where it would come in contact with brushes attached to the slider block 612. If the toothed blades 604 are made out of metal, each blade/slider block assembly may act as the moving part of a potentiometer. By measuring the electrical resistance between the blades, the position of all blades and hence the associated finger segments may be determined. All finger sideway motions may be detected by conventional potentiometers mounted at the pivoting points of the ExoPlates.

Figure 7A:
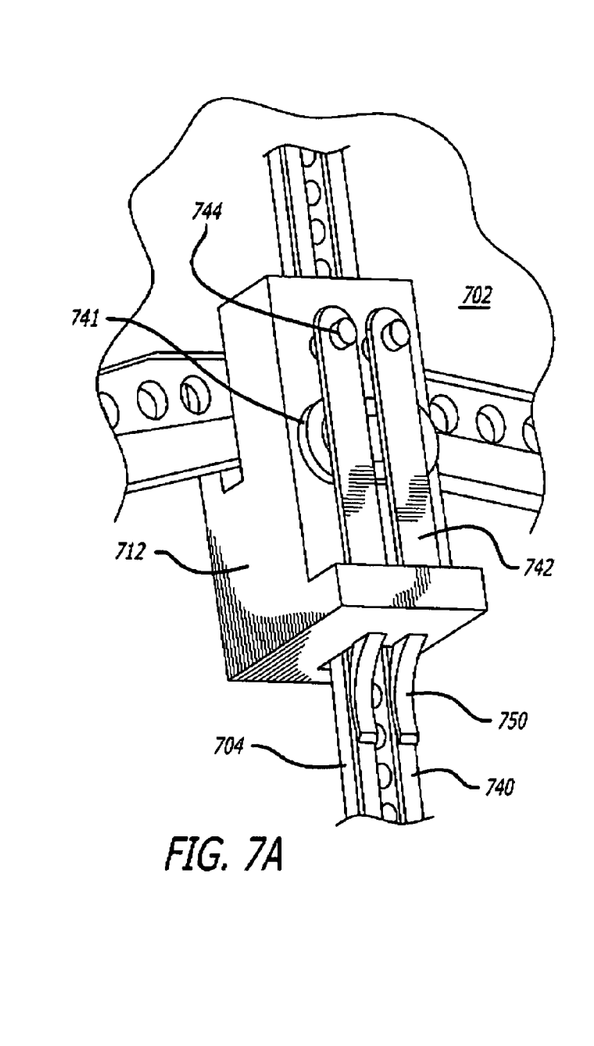
FIGS. 7A and 7B illustrate an embodiment of a haptic apparatus in which a latch mechanism is used to restrict motion of a user's finger segment.
Figure 7B:
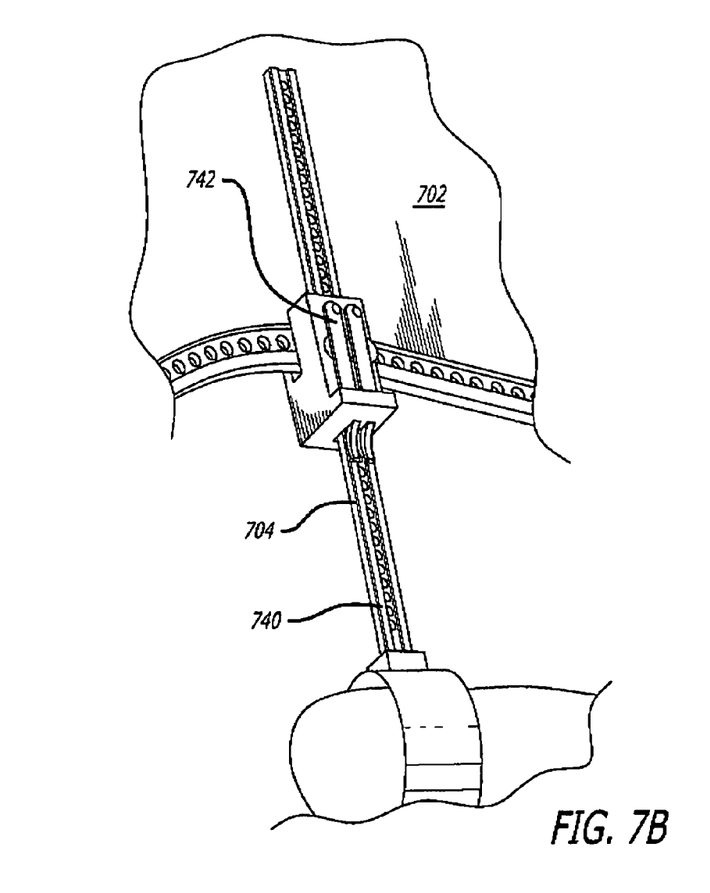

FIGS. 7A and 7B illustrate an embodiment of a haptic apparatus in which a latch mechanism is used to restrict motion of a user's finger segment. In this embodiment, the blade 704 may be passively fixed onto the finger strap. The electric power may be transferred to the slider block 712 through two conductive strips 740 attached to the non-conductive blade 704. The power in the conductive strips 740 may be delivered by means of brushes 750 to an electromagnetic coil 741, which may attract two metallic latches 742 simultaneously. The latches 742 may each drive a pin 744 into apertures placed on the blade 704 and on the ExoPlate 702, respectively. The pin motions may be independent of one another. If one pin does not line up with a hole, it may not restrict the motion of the other pin.

In the configuration illustrated in FIGS. 7A and 7B, the slider block 712 can be pinned onto the ExoPlate 702, and at the same time the blade 704 may be pinned onto the slider block 712 whenever the power is applied to the conductive strips 740. Compared to the rotating blade approach described above, the latch mechanism illustrated in FIGS. 7A and 7B may be built in miniature scale, because the power required is very small since only the small latches on the slider block need to be moved.

It may still be possible to generate and apply an independent proportional force for each finger segment, with the alternative latch mechanism described above. The electric wires connected to the strips 740 at the base of the blade 704 may be in coil form, such as a telephone handset wire, to allow the rising of the blade end.

In sum, haptic apparatuses have been described that provide a user with a realistic feeling of grasp, and that are applicable to all finger segments and the palm, as opposed to being applicable to finger tips only. The haptic apparatuses described above may be capable of responding to gesture signals at relatively high frequencies, thereby providing an extremely realistic and dynamic sense of grasp. These haptic apparatus may have maximum numbers of pressure points for force feedback, and hence may provide force feedback to a large number of relevant pressure points, up to about fifteen. No unrealistic or unnecessary force may be exerted on unwanted areas on fingers. Force feedback may be bidirectional, i.e., force may be applied both under and above each finger segment. Also, the force feedback mechanism may be engaged at the hand area rather than at remote cable-connected locations that generally result in a sluggish and unrealistic sense of grasp, because of cable stretch and accumulation of various mechanical backlashes. These haptic apparatuses may perform gesture measurement without need for additional devices such as exoskeleton gloves, and therefore may be worn on the bare hand with minimal intrusive hardware. Finally, these haptic apparatuses may be manufactured at a relatively low cost.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of what is disclosed above. Thus, the apparatuses and methods described above are not intended to be limited to the embodiments shown herein, but are to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether or not such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A haptic apparatus comprising:
   a plate element positionable to extend over an elongated anatomical segment of a user;
   a plurality of elongate members, each coupled to the plate element at a different location and configured to be mounted onto a different portion of the anatomical segment at a different location along the length of the elongated anatomical segment so as to remain substantially perpendicular to the portion of the anatomical segment while the portion of the anatomical segment undergoes a motion; and
   a plurality of motion restrictors, each coupled to one of the elongate members and responsive to a control signal to impede the motion of the portion of the anatomical segment to which the elongate member is mounted separately from the motion of other portions of the anatomical segment by generating an opposing force along the elongate member in a direction normal to the portion of the anatomical segment, thereby providing tactile feedback to the user, each motion restrictor configured to operate independent of the other.

2. The haptic apparatus of claim 1, wherein the plate element comprises an exoskeleton plate.

3. The haptic apparatus of claim 1, wherein the opposing force generated by each motion restrictor comprises a bidirectional force that includes both an upward component and a downward component along the elongate member.

4. The haptic apparatus of claim 1,
   wherein each motion restrictor comprises an actuator coupled to the elongate member and its associated portion of the anatomical segment; and
   wherein each actuator is responsive to the control signal to cause the elongate member to become engaged onto an edge of the plate element, thereby impeding further motion of the elongate member and its associated portion of the anatomical segment.

5. The haptic apparatus of claim 4,
   wherein each elongate member comprises a toothed blade that is rotatably mountable onto its associated portion of the anatomical segment, and
   wherein each actuator comprises a rotation actuator configured to be disposed over its portion of the anatomical segment, the rotation actuator being responsive to the control signal to activate rotation of the blade so as to engage teeth of the blade onto the edge of the exoskeleton plate.

6. The haptic apparatus of claim 1,
   further comprising a plurality of slider blocks, each configured to couple one of the elongate members to the plate element.

7. The haptic apparatus of claim 1,
   wherein each motion restrictor comprises a latch mechanism configured to drive one or more pins into corresponding apertures in the elongate member and the plate element when supplied with electric power.

8. The haptic apparatus of claim 1, further comprising a controller configured to sense the motion of the anatomical segment and to compute the relative position of the anatomical segment with respect to a virtual object, the controller further configured to generate at least one control signal upon detecting a collision in virtual space between the virtual object and a virtual segment representing the anatomical segment.

9. The haptic apparatus of claim 1, further comprising:
   a position sensor configured to detect a position and a motion of the anatomical segment; and
   a controller responsive to information from the position sensor relating to the detected position and motion of the anatomical segment to compute the relative position of the anatomical segment with respect to a virtual object, and to generate at least one control signal upon detecting a collision in virtual space between the virtual object and a virtual segment representing the anatomical segment.

10. The haptic apparatus of claim 1,
    wherein the anatomical segment comprises a finger segment,
    wherein the plate element is pivotable toward a palm of the user's hand, and
    further comprising a restriction mechanism configured to restrict the pivoting motion of the plate element so as to provide to the user force feedback relating to grasping of an elastic object.

11. The haptic apparatus of claim 10, wherein the restriction mechanism comprises at least one of:
    a servo motor; and
    a restraining cable connected to the plate element and operable to restrain the pivoting motion of the plate element.

12. The haptic apparatus of claim 1, wherein the plate element comprises at least one of a carbon composite material and a polycarbonate material.

13. The haptic apparatus of claim 1, wherein the plate element is sideways pivotable and further comprising at least one sheet element attached to a base of the plate element, the at least one sheet element extending from a side of the anatomical segment and configured to transfer a sideway motion of the anatomical segment to the plate element.

14. A haptic apparatus comprising:
    a plurality of assemblies, each assembly comprising:
       an exoskeleton plate positionable so as to extend over an anatomical segment of a user;
       a plurality of elongate members, each coupled to the exoskeleton plate at a different location and configured to be mounted onto a different portion of the anatomical segment so as to remain substantially perpendicular to the portion of the anatomical segment while the portion of the anatomical segment undergoes a motion; and
       a plurality of motion restrictors, each coupled to one of the elongage members and responsive to a control signal to impede the motion of the portion of the anatomical segment to which the elongate member is mounted separately from the motion of other portions of the anatomical segment by generating an opposing feedback force along the elongate member in a direction normal to the portion of the anatomical segment, thereby providing tactile feedback to the user, each motion restrictor configured to operate independent of the other.

15. The haptic apparatus of claim 14,
    wherein in each of the plurality of haptic assemblies, each of the elongate members comprises a toothed blade that is rotatably mountable onto the anatomical segment, and
    wherein in each of the plurality of haptic assemblies, each of the actuators comprises a rotation actuator configured to be disposed over the anatomical segment, the rotation actuator being responsive to the control signal to activate rotation of the blade to engage teeth of the blade onto the edge of the exoskeleton plate.

16. The haptic apparatus of claim 14, further comprising a controller configured to sense the motion of an anatomical segment and the relative position of the anatomical segment with respect to a virtual object, the controller further configured to generate the control signal upon detecting a collision in virtual space between the virtual object and a virtual segment representing the anatomical segment.

17. A haptic apparatus comprising:

an exoskeleton plate positionable so as to extend over an anatomical segment of a user;

a plurality of elongate members, each coupled to the exoskeleton plate at a different location and configured to be mounted onto a different portion of the anatomical segment so as to remain substantially perpendicular to the anatomical segment while the portion of the anatomical segment undergoes a motion; and force feedback means responsive to a control signal for impeding the motion of each portion of the anatomical segment separate from other portions by generating an opposing feedback force along each elongate member in a direction normal to the portion of the anatomical segment to which the elongate member is mounted, thereby providing tactile feedback to the user.

18. A method comprising: mounting a plurality of elongate members, each to a different portion of an anatomical segment of a user so that each elongate member remains substantially perpendicular to the portion of the anatomical segment to which it is mounted while the portion of the anatomical segment undergoes a motion;

sensing a change in the position of each portion of the anatomical segment with respect to a virtual object during the motion; and upon detection of an imminent collision between at least one of the portions of the anatomical segment and the virtual object, impeding further motion of the portion of the anatomical segment separate from other portions by generating an opposing force along the elongate member in a direction normal to the portion of the anatomical segment, thereby providing tactile feedback to the user.

19. A haptic apparatus comprising:

two or more motion restrictors, each configured to mount onto a location of an elongated anatomical segment along the length of the elongated anatomical segment different from the location along the length onto which the other motion restrictors are mounted and to deliver a motion-impeding force to the location of the anatomical segment to which it is mounted independent of the motion-impeding force applied by the other motion restrictors; and a controller configured to controllably cause each of the motion restrictors to apply the motion-impeding force to the location of the anatomical segment to which it is mounted independent of the motion-impeding force applied by the other motion restrictors so as to simulate the anatomical segment coming into contact with real objects that impede the motion of the anatomical segment at different locations along its length.

* * * * *